UNITED STATES PATENT OFFICE.

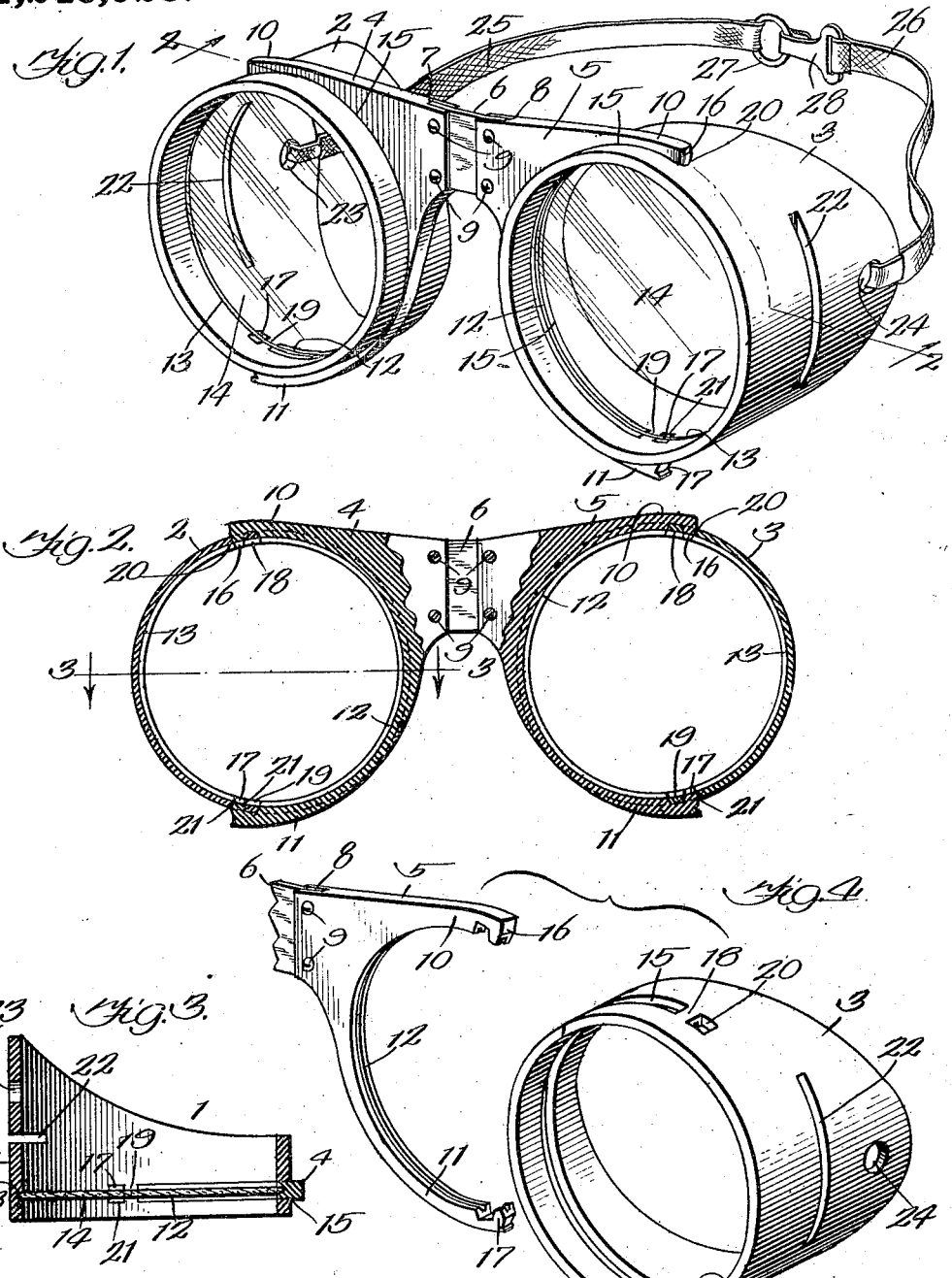

FRANK A. IHRCKE, OF CHICAGO, ILLINOIS.

WELDING-GOGGLES.

1,246,928.   Specification of Letters Patent.   Patented Nov. 20, 1917.

Application filed May 4, 1917. Serial No. 166,281.

*To all whom it may concern:*

Be it known that I, FRANK A. IHRCKE, a citizen of the United States, residing at Chicago, in the county of Cook and State of Illinois, have invented certain new and useful Improvements in Welding-Goggles, of which the following is a specification.

My invention relates to goggles and has particular reference to constructions and materials adapted to protect workmen exposed to great heat in the course or place of employment. One object of the present invention is to provide a construction particularly adapted to fiber material although equally serviceable if other materials are used. Another object of this invention is to effect a simplification of parts and to reduce the weight and amount of material required for its embodiment. A still further object of the invention is to facilitate a quick and convenient replacement of broken parts at small cost, especially the lenses which are frequently broken, and to utilize the bridge, web, nose-piece, or lens-frame connecting portions as retainers which hold the lenses in place in their frames without recourse to separate parts for that purpose.

With the above-named objects in view my invention consists in the novel construction, combination and arrangement of parts, all as hereinafter described in detail, illustrated in the accompanying drawing, and more particularly pointed out in the appended claims.

In the drawing—

Figure 1 is a perspective view of a pair of goggles embodying my invention.

Fig. 2 is a face view thereof partly in section.

Fig. 3 is a section taken substantially on the line 3—3 of Fig. 2.

Fig. 4 is a perspective view of one of the lens frames, eye-shield cups, or lens-holders, with one-half of the nose-piece, bridge, or connective web and a flexible hinge broken away, the nose-piece portion and shield being separated.

In the several views 2 and 3 are the individual lens frames or side shields which, with the nose-piece, hold the lenses. These shields are made of, preferably, light material which is porous and a poor conductor and retainer of heat. The two shields are connected by a bridge consisting of the usual nose-piece form and a semi-circular clasp at each end thereof, in two members 4 and 5 connected by any preferred form of hinge, such as a flexible hinge 6 held in grooves 7 and 8 in the vertical opposed edges of the members 4 and 5, as shown. The hinge 6 is in the present instance shown secured in its grooves by screws or rivets 9. Each of the members 4 and 5 has jaw-members 10 and 11 together forming approximately a semi-circle in which is a groove 12, which with a similar groove 13 in the shield form an annular recess adapted to receive the edge of a lens 14. For the semi-circular clasp 10, 11, 12 a slit 15 is formed in the shield in which the jaw-members are held by lugs 16 and 17 formed by cutting away a portion of each jaw member near its end. This cut away portion on the jaw 10 is engaged by an imperforate part 18 and on the jaw 11 by a similar part 19 left between the ends of the groove 15 and holes 20 and 21 for the lugs 16 and 17 which are snapped into said holes. A slot 22, or other suitable opening, or openings, is or are formed to provide for ventilation through the shield. Holes 23 and 24 are provided for straps or elastics 25 and 26 which are conveniently coupled together at their meeting ends by a ring 27 and a hook 28.

When a lens 14 is broken it, or the remaining pieces thereof, are removed through the opening 15 by springing apart the jaws 10 and 11 and disengaging the lugs 16 and 17 as in Fig. 4; then a new lens may be instantaneously inserted through the slit 15 and the clasp snapped into place as in Figs. 1 and 2. This form of construction is light, cool and quite neat in appearance.

I claim as my invention—

1. The combination with a pair of goggles of periphractic lens frames having peripheral slits therein and lenses therefor, of a bridge or nose-piece which connects said lens frames and also serves to hold said lenses in said frames.

2. The combination with goggles, of peripherally continuous lens-frames having lens-recesses therein, the lenses, and a lens-frame connecting portion which is a part of the lens-holding rim for each of the lenses.

3. The combination with eye-shields of a pair of goggles, of a nose-piece formed with a pair of jaws for each eye-shield and between which jaws said eye-shield is held.

4. The combination with lens-frames having substantially semi-circular lens slits in their peripheries, of a bridge which closes said slits and forms parts of lens-holding frame portions of said goggles.

5. The combination with goggles, of peripherally slotted frames, and a nose-piece which closes the slots and is a removable part of the lens retaining frames.

6. The combination with goggles, of lens-supporting eye-shields having openings therein through which the lenses are inserted in their frames, a bridge with spring jaw portions which close said openings, and means holding said portions in engagement with said eye-shields.

7. The combination with goggles, of eye-shielding frames having slits in their peripheries through which the lenses are inserted edgewise, and a nose-piece and bridge which snaps into engagement with said frames and serves as a retainer for said lenses.

In testimony whereof I have hereunto signed my name.

FRANK A. IHRCKE.

Copies of this patent may be obtained for five cents each, by addressing the "Commissioner of Patents, Washington, D. C."